United States Patent
Moreira et al.

(10) Patent No.: US 6,878,225 B2
(45) Date of Patent: Apr. 12, 2005

(54) CONNECTION WITH A COMPONENT PRODUCED OF A THERMOPLASTIC ELASTOMER

(75) Inventors: Antonio Avides Moreira, Barcelona (ES); Markus J. H. Bulters, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 259 days.

(21) Appl. No.: 09/801,090

(22) Filed: Mar. 8, 2001

(65) Prior Publication Data

US 2001/0040000 A1 Nov. 15, 2001

Related U.S. Application Data

(63) Continuation of application No. PCT/NL99/00554, filed on Sep. 7, 1999.

(30) Foreign Application Priority Data

Sep. 8, 1998 (NL) ............................................. 1010022

(51) Int. Cl.$^7$ ......................... B29C 61/00; B29C 61/06
(52) U.S. Cl. ........................ 156/229; 220/265; 220/782
(58) Field of Search ................................. 156/182, 229; 220/200, 265, 270, 782

(56) References Cited

U.S. PATENT DOCUMENTS

| | | | |
|---|---|---|---|
| 2,994,933 A | | 8/1961 | Wolfe |
| 3,961,421 A | * | 6/1976 | Wallshein ................ 433/18 |
| 4,342,806 A | * | 8/1982 | Kutsch .................... 428/174 |
| 4,533,321 A | * | 8/1985 | Kidd et al. ............... 433/18 |
| 4,560,083 A | * | 12/1985 | Danico .................... 220/241 |
| 4,784,285 A | * | 11/1988 | Patel ....................... 220/782 |
| 5,071,017 A | * | 12/1991 | Stull ........................ 220/257.2 |
| 5,151,152 A | * | 9/1992 | Kaeufe et al. ............ 216/53 |
| 5,944,211 A | * | 8/1999 | Woodnorth et al. ..... 220/367.1 |
| 6,001,464 A | * | 12/1999 | Schultze et al. ......... 264/46.8 |
| 6,145,688 A | * | 11/2000 | Smith ...................... 220/259.3 |

FOREIGN PATENT DOCUMENTS

| | | |
|---|---|---|
| DE | 3523771 | 1/1987 |
| DE | 3826428 | 2/1990 |
| EP | 0367014 | 5/1990 |
| EP | 0390060 | 10/1990 |
| FR | 2128340 | 10/1972 |
| JP | 61293214 | 12/1986 |
| JP | 4170426 | 6/1992 |
| JP | 2000154310 A * | 6/2000 ........... C08L/67/02 |

OTHER PUBLICATIONS

Thermoplastic Elastomers, 2$^{nd}$ Edition, Holden et al. eds., Hanser Publishers, pp. 576, 593.*
Translation of DE 3523771 A1.*

* cited by examiner

Primary Examiner—Sue A. Purvis
(74) Attorney, Agent, or Firm—Mayer Brown Rowe & Maw

(57) ABSTRACT

The invention relates to a process for bringing about a permanent connection between at least two components, one of which components is obtained by moulding of a thermoplastic elastomeric material, characterized in that the component is subjected to a treatment comprising the following steps:

a. stretching of the component of thermoplastic elastomeric material
b. relaxation of the component subjected to step (a) at ambient temperature
c. placement of the component obtained sub (b) at the location of the desired connection in the object
d. exposure to an increased temperature of at most about 20° C. below the melting point of the thermoplastic elastomer.

Application of the process of the invention, in particular during step (d), produces a shrunk connection which provides a permanent seal under tension.

The invention may be applied for many types of connections and seals, for example body plugs, shrink-on sleeving, sealing rings, etc. Especially suitable, particularly in automotive applications, are copolyether esters.

8 Claims, No Drawings

CONNECTION WITH A COMPONENT PRODUCED OF A THERMOPLASTIC ELASTOMER

This application is a continuation of PCT/NL 99/00554, filed Sep. 7, 1999.

The invention relates to a component produced of a thermoplastic elastomer which is applied in a permanent connection between at least two components in an object and a process for the fashioning of this connection. The invention is particularly aimed at a process for bringing about a sealing connection between two components in an object.

Sealing components of thermoplastic elastomer materials are known and find wide application. For example as a body plug, that is, a plug for sealing holes needed in the construction of, for example, a car body or refrigerator to prevent ingress of water, gasket rings, sealing rings, shrink-on sleeving and the like. Application of sealing objects of thermoplastic elastomer material presents important advantages in that the thermoplastic properties allow more complex moldings to be mass-produced in a fairly simple manner, which is not possible in the case of rubber materials since, here, vulcanisation needs to take place in the mould. However, a disadvantage of the sealing or connecting objects fabricated of thermoplastic elastomeric material is that they allow only a limited degree of deformation when they are fitted. In general a degree of deformation of the order of some tens of percents is not completely reversible and results in permanent deformation.

If the initial deformation is 100%, permanent deformation often can be as high as 40%.

This is referred to as a tension set of 40%. In general, such tension set is less than 10% for rubbers. In some case, performance is inadequate because of this higher tension set and also because thermoplastic elastomeric materials generally are harder due to the presence of hard segments in the matrix. Consequently, the object of the invention is to provide a process for the fashioning of a permanent connection between two components of an object, in which at least one component is obtained by moulding of a thermoplastic elastomeric material, which results in an improved seal.

The object of the invention is achieved by the process described in claim 1. Thermoplastic elastomeric materials are described extensively in for example Thermoplastic Elastomers, 2nd edition, G. Holden e.a. editor, Hanser Verlag (1996), ISBN 1-56990-205-4, and the literature cited therein.

The invention can in principle be applied to all currently common thermoplastic elastomers that are applied in components used in connections. Based on their chemical resistance, for instance, use is preferably be made of thermoplastic elastomers based on polyurethanes, polyesters and polyamides as hard block in copolymers and combinations of a hard thermoplastic polymer and an elastomer such as polypropylene -EPDM or EPR combinations.

The aforementioned thermoplastic elastomeric materials are commercially obtainable under various brand names. Blends of hard thermoplastic polymers with thermoplastic elastomers can also be used. The thermoplastic elastomeric materials may contain common additives, for example fillers such as talcum, carbon black, reinforcing fillers such as mica, stabilizers, colorants and processing aids.

Moulding can be effected using common techniques, for example by injection moulding and extrusion techniques.

In general, stretching is effected perpendicularly to the plane in which the connection is to be brought about.

The degree of stretching needed for the process of the invention is determined from case to case and is much dependent on the shape of the component and the connection to be applied.

Stretching here means such amount of deformation as causes more than 10% of the deformation to remain on release of the tension by which the deformation was brought about. This is normally related to the temperature range from $-40°$ C. to $+60°$ C., henceforth referred to as ambient temperature.

In general, stretching occurs when deformation amounts to more than 50%, and stretching occurs sooner in harder thermoplastic elastomers than in softer ones.

In general, stretching will not be applied in excess of 200%, preferably 100%, because otherwise the deformation remaining on release of the deforming tension, also known as tension set, is too large and less reproducible.

The time during which stretching is applied may vary between wide limits; for reasons of production it is chosen to be as short as possible, for example 10 seconds. The required time is determined in part by the reproducibility of the set remaining after relaxation of the component at ambient temperature.

For reasons of economics, the increased temperature to which the connection eventually is exposed is chosen to be as high as possible but not higher than a temperature which is about $20°$ C. below the melting point of the thermoplastic elastomer. The melting point of the thermoplastic elastomer is here defined as the temperature at which the summit of the peak in the heating curve of the differential scanning calorimetric (DSC) measurement, at a heating rate of $20°$ C./min., is located.

It is highly surprising that, under these conditions, the component, having relaxed at ambient temperature, exhibits substantial shrinkage towards the deformation, as a result of which a continuous connection in tension is established.

The time during which the connection is exposed to the increased temperature may vary between wide limits and is often determined by production-related considerations. In general, however, the time should be limited because otherwise the tension at which the connection is brought about will diminish too strongly. A duration of between 0.5 and 30 minutes suffices in most cases.

The invention is illustrated by the following examples.

EXAMPLE 1

In this example the process of the invention is illustrated with reference to a body plug used for sealing holes in a metal sheet. The body plug is obtained by injection moulding whereupon it is stretched perpendicularly to the plane in which the connection is to be brought about, which, in this example, is effected immediately after the colling of the mould of the injection moulding machine with an attachment in he mold. Next, the stretched body plug can relax, at ambient temperature of $23°$ C., to substantially reassume its original dimensions. Once the body plug is inserted in the hole in the metal sheet, the heat treatment at elevated temperature ($170°$ C.) is carried out. In the automotive industry this operation preferably coincides with the paint spraying line. During the latter heat treatment the plug tightly contacts the surface of the metal sheet and is retained in tension.

Of course, the dimensions of the body plug are accurately adjusted to suit the deformations to be undergone, and can be established through experiment using test bars of the thermoplastic elastomeric material used.

For applications in the automotive industry it is preferred to use polyether ester elastomers based on polybutylene terephthalate as the hard segment inasmuch as, inter alia, such materials are well able to withstand the high temperature occurring in the paint spraying line and are well paintable.

EXAMPLE II

This example indicates in broad terms the characteristics of the thermoplastic elastomeric material that need to be determined for proper shaping of the component to be used in the process of the invention and for establishing the suitability of a material for the process of the composition.

Test bars shaped like dumbbel sets with critical dimensions of 4×20 mm and 1 or 2 mm thick were cut from injection-moulded sheets. Tensile tests were conducted using a Zwick 1445 tensile testing machine. The test bars were deformed at 60° C. and the deformation was maintained for 10 seconds.

After deformation at 60° C. the test bars were stored at room temperature for 24 hours with tension released and recovery of the original shape was monitored.

Deformation and recovery of the original shape (relaxation) were measured on the basis of the distance between two markings each provided at 10 mm on either side of the centre of the narrow section of the test bars.

Relaxation was monitored thereafter for 30 minutes in an oven at 170° C. A parallel measurement was conducted to determine the tension in a test bar whose length was kept constant.

Table 1 shows for three copolyether esters the recovery after different deformation as a function of time at 170° C. and under the following conditions:
a) 50% initial elongation, b) 100% and c) 200%.

TABLE 1

|  | Arnitel PL380 (A) | | | | Arnitel PL380 (B) | | | Arnitel PL580 (C) | | | |
|---|---|---|---|---|---|---|---|---|---|---|---|
| d/strain | 25% | 50% | 100% | 200% | 25% | 50% | 100% | 25% | 50% | 100% | 200% |
| di(mm)*1 | 19,82 | 19,83 | 19,58 | 19,68 | 19,53 | 19,79 | 19,33 | 19,69 | 19,49 | 19,60 | 19,61 |
| 2 | 19,44 | 19,46 | 19,50 | 19,52 | 19,53 | 19,59 | 19,45 | 19,60 | 19,94 | 19,63 | 19,38 |
| 3 | 19,81 | 19,74 | 19,84 | 19,47 | 19,41 | 19,65 | 19,29 | 19,55 | 19,74 | 19,72 | 19,65 |
| dR1(mm) | 20,40 | 20,93 | 22,82 | 30,38 | 19,58 | 21,32 | 23,00 | 20,80 | 22,02 | 28,72 | 40,56 |
|  | 20,18 | 20,70 | 24,19 | 29,89 | 20,05 | 21,33 | 22,92 | 20,81 | 22,19 | 29,94 | 42,49 |
|  | 20,49 | 20,97 | 24,62 | 29,84 | 20,12 | 21,50 | 22,71 | 20,59 | 22,65 | 29,67 | 44,65 |
| dR2(mm) | 20,22 | 20,76 | 21,47 | 24,18 | 18,98 | 20,23 | 20,55 | 20,28 | 20,87 | 24,80 | 32,64 |
|  | 19,94 | 20,44 | 21,79 | 23,41 | 19,22 | 20,12 | 20,70 | 20,24 | 21,24 | 23,94 | 33,20 |
|  | 20,26 | 20,75 | 21,82 | 24,03 | 19,38 | 20,11 | 20,46 | 19,85 | 21,42 | 24,50 | 33,46 |

*Number of the sample
Where di is the initial distance between two marks, dR1 is the distance between the two marks after relaxation at 23° C. and dR2 is the distance between the two marks after relaxation at 170° C.

The data in the table indicate that polyether ester B seems most suited for the process of the invention because recovery of the original dimensions after shrinkage at 170° C. is high and the tension remains at a high and constant level especially when the initial deformation has been 100% or more.

The latter is also the case with copolyether ester C; however, the residual deformation remains high. In addition, the hardness of C is higher than that of B.
A=Arnitel PL380®, Shore D hardness=38
B=Arnitel PL380® B, Shore D hardness=38 modified form of Arnitel PL380®
C=Arnitel PL580®, Shore D hardness=58
Arnitel P® copolyether ester based on polybutylene terephthalate as hard segment and polypropylene oxide endcapped with ethylene oxide as soft segment, a commercial product of DSM, of the Netherlands.

What is claimed is:

1. A process for fashioning a permanent connection between at least 2 components, at least one of said components being a thermoplastic sealing or connecting member obtained by molding a thermoplastic elastomeric material, at least one other component being a non-sealing member, said permanent connection being located at a desired location of said non-sealing member, comprising:

a. stretching said sealing or connecting member;

b. relaxing said stretched member from step (a) at ambient temperature;

c. placing said member from step (b) at the desired location on said non-sealing member; and d. exposing said members from step (c) to an increased temperature of at most about 20° C. below the melting temperature of the thermoplastic elastomeric material.

2. A process according to claim 1, wherein the thermoplastic elastomeric material is a copolyether ester.

3. A process according to claim 1, wherein the thermoplastic elastomeric material comprises a block copolymer comprising hard blocks, wherein said hard blocks comprise polyurethane, polyester or polyamide.

4. A process according to claim 1, wherein the thermoplastic sealing or connecting member is a body plug, gasket ring, sealing ring, or shrink-on sleeving.

5. A process for fashioning a permanent connection between at least 2 components with at least one thermoplastic sealing or connecting component obtained by molding the component from a thermoplastic elastomeric material, stretching the component, and relaxing the component at ambient temperature, and at least one non-sealing member, comprising:

a. placing said thermoplastic sealing or connecting component at the location of the desired connection on said non-sealing member, and b. exposing said thermoplastic sealing or connecting component to an increased temperature of at most about 20° C. below the melting point of the thermoplastic elastomeric material.

6. A process for fashioning a permanent connection between at least 2 components, with at least one thermoplastic sealing or connecting component according to claim 5, wherein the thermoplastic elastomeric material is a copolyetherester.

7. A process according to claim 5, wherein the thermoplastic elastomeric material comprises a block copolymer comprising hard blocks, wherein said hard blocks comprise polyurethane, polyester or polyamide.

8. A process according to claim 5, wherein the thermoplastic sealing or connecting member is a body plug, gasket ring, sealing ring, or shrink-on sleeving.

* * * * *